United States Patent
Sakata et al.

(10) Patent No.: US 6,371,164 B2
(45) Date of Patent: Apr. 16, 2002

(54) OIL CONTROL VALVE CAPABLE OF PREVENTING REDUCTION IN OIL FLOW

(75) Inventors: Akira Sakata; Takayuki Itou; Yoshiki Kobayashi, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/849,295

(22) Filed: May 7, 2001

Related U.S. Application Data

(63) Continuation of application No. PCT/JP99/05020, filed on Sep. 14, 1999.

(51) Int. Cl.[7] .............................................. F15B 13/044
(52) U.S. Cl. ............................. 137/625.69; 137/625.65
(58) Field of Search ..................... 137/625.69, 625.65

(56) References Cited

U.S. PATENT DOCUMENTS

| | | | | |
|---|---|---|---|---|
| 2,985,190 A | * | 5/1961 | Kettering ............... | 137/625.69 |
| 2,987,050 A | * | 6/1961 | Oppenheimer et al. | 137/625.69 X |
| 3,163,175 A | * | 12/1964 | Pearson .............. | 137/625.69 X |
| 3,253,617 A | * | 5/1966 | Beckett ................. | 137/625.69 |
| 4,026,325 A | * | 5/1977 | Loveless ............ | 137/625.69 X |
| 5,483,930 A | * | 1/1996 | Moriya et al. ........... | 123/90.17 |
| 5,623,896 A | * | 4/1997 | Kato et al. ........... | 137/90.17 X |
| 5,878,782 A | * | 3/1999 | Nakajima ............... | 137/625.65 |
| 5,988,126 A | * | 11/1999 | Strauss et al. ........... | 123/90.17 |

FOREIGN PATENT DOCUMENTS

| | | |
|---|---|---|
| JP | 47-17253 | 5/1972 |
| JP | 7-17907 | 3/1985 |
| JP | 63-109081 | 7/1988 |
| JP | 1-51712 | 11/1989 |
| JP | 6-14651 | 2/1994 |
| JP | 7-139318 | 5/1995 |
| JP | 7-139319 | 5/1995 |
| JP | 7-151257 | 6/1995 |

OTHER PUBLICATIONS

International Search Report.

* cited by examiner

*Primary Examiner*—Gerald A. Michalsky
(74) *Attorney, Agent, or Firm*—Sughrue Mion, PLLC

(57) ABSTRACT

An oil control valve includes a cylindrical valve housing and ports and formed in a periphery of the valve housing so as to face pipes, respectively, that guide hydraulic oil to an actuator. The valve housing is provided with a groove that provides communication between the port and the pipeline and a groove that provides communication between the port and the pipeline.

4 Claims, 6 Drawing Sheets

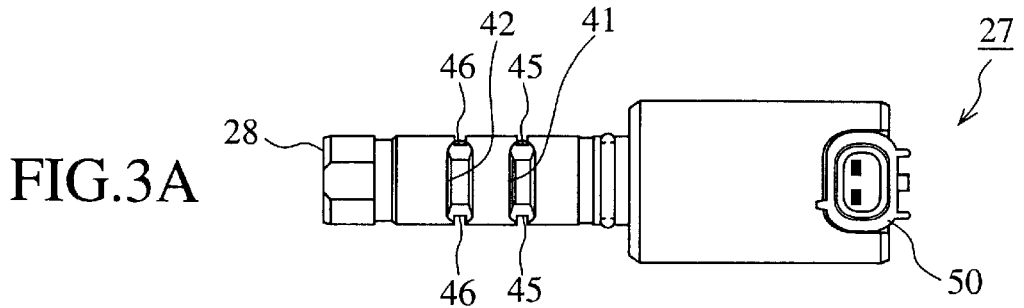
FIG.3A
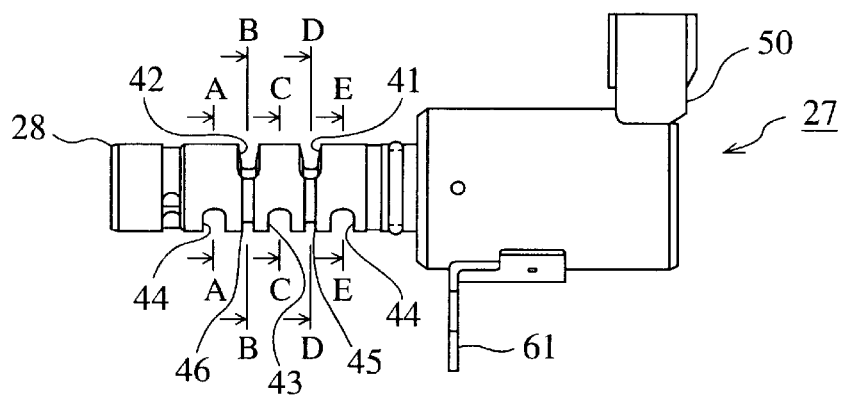
FIG.3B
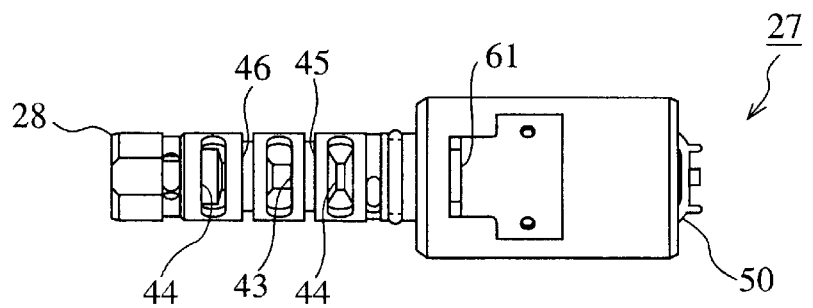
FIG.3C
FIG.3D
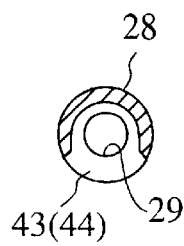
FIG.3E
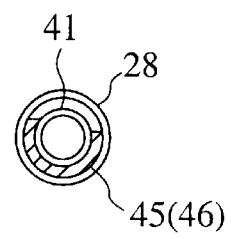

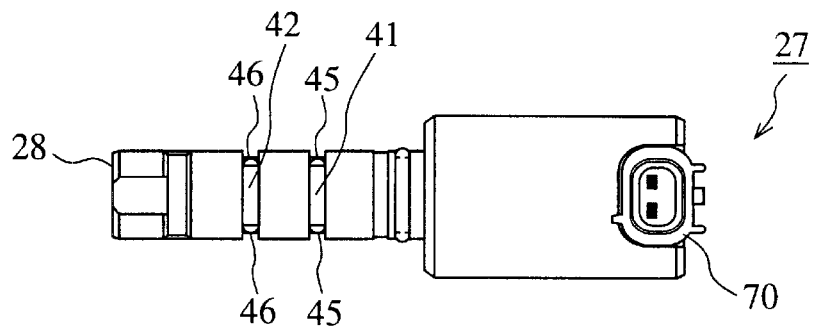
FIG.6A
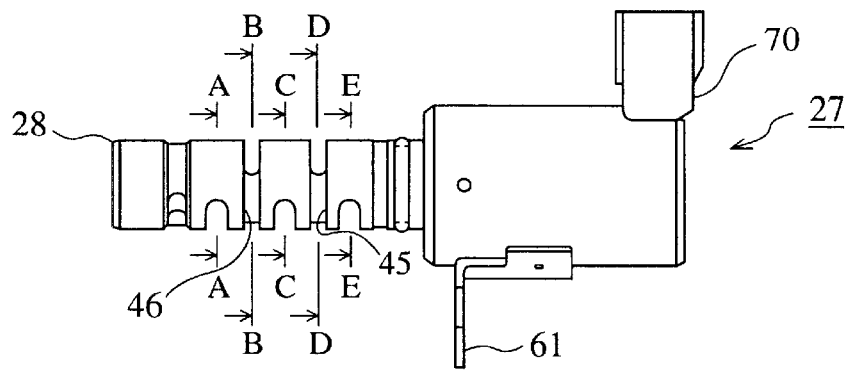
FIG.6B
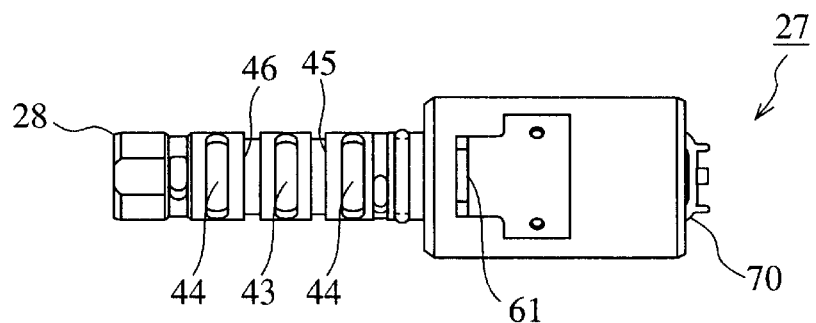
FIG.6C
FIG.6D
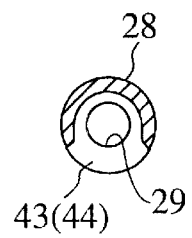
FIG.6E
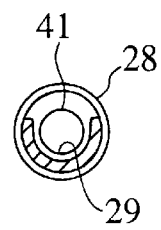

OIL CONTROL VALVE CAPABLE OF PREVENTING REDUCTION IN OIL FLOW

CROSS-REFERENCE TO THE RELATED APPLICATION

This application is a continuation of International Application No. PCT/JP99/05020, whose international filing date is Sep. 14, 1999, the disclosures of which Application are incorporated by reference herein.

BACKGROUND OF THE INVENTION

1. Field of the Invention

The present invention relates to an oil control valve for supplying hydraulic oil to a blade oil hydraulic actuator for controlling an intake valve or exhaust valve to open or close timely depending on the operating condition of an engine so as to control the oil level of the oil hydraulic actuator.

2. Description of the Related Art

FIG. 1 is a sectional diagram showing a blade oil hydraulic actuator according to the related art. Reference numeral 1 indicates an intake cam shaft (hereinafter, simply referred to as a cam shaft) provided with an intake cam 1a. Numeral 2 indicates a timing pulley provided at an end of the cam shaft 1. Numeral 3 indicates an actuator coupled to the cam shaft 1 so as to control valve opening/closing timing. Hydraulic oil supplied to drive the actuator 3 is lubricating oil for the engine (not shown). The actuator 3 is driven by the hydraulic oil to vary a displacement angle of the cam shaft 1 so that the opening and closing timing of the intake valve (not shown) is continuously controlled. Numeral 4 indicates a bearing of the cam shaft 1. Numeral 5 indicates a housing of the actuator 3 and is rotatably fitted to the cam shaft 1.

Numeral 6 indicates a case secured to the housing 5. Numeral 7 indicates a blade rotor connected to the cam shaft 1 by a bolt 8 and housed in the case 6. The rotor 7 is rotatable with respect to the case 6. Numeral 9 indicates a tip seal provided between the case 6 and the rotor 7 so as to prevent leakage of oil between oil hydraulic chambers bounded by the case 6 and the rotor 7. Numeral 10 indicates a back spring formed of a flat spring for forcing the tip seal 9 to be in contact with the rotor 7. Numeral 11 indicates a cover secured to the case 6. Numeral 12 indicates a bolt securing the housing 5, the case 6 and the cover 11 to each other. Numeral 13 indicates an O-ring. Numeral 14 indicates a plate. Numeral 15 indicates a bolt securing the plate 14 to the cover 11. Numerals 16 and 17 indicate O-rings. Numeral 18 indicates a cylindrical holder provided in the rotor 7. An engagement hole 18a, for engaging a plunger described later therewith is provided in the holder 18 to extend in an axial direction.

Numeral 19 indicates a plunger slidably provided in the housing 5 and provided with an engagement shaft portion 19a fitted within the hole 18a of the holder 18. Numeral 20 indicates a spring for urging the plunger 19 toward the holder 18. Numeral 21 indicates a plunger oil passage for introducing the hydraulic oil into the engagement hole 18a of the holder 18. The hydraulic oil introduced into the engagement hole 18a of the holder 18 via the plunger oil passage 21 displaces the plunger 19 against the urging force of the spring 20 so that the holder 18 is released from the locking action provided by the plunger 19. Numeral 22 indicates an air vent. Numeral 22 indicates an air vent. Numeral 23 indicates a shaft bolt for securing the rotor 7 to the cam shaft 1. Numeral 24 indicates an air vent.

Numeral 25 indicates a first oil passage provided in the cam shaft 1 and the rotor 7 to communicate with a lag oil hydraulic chamber (not shown) for displacing the rotor 7 in a lagging direction. Numeral 26 indicates a second oil passage provided in the cam shaft 11 and the rotor 7 to communicate with an advance oil hydraulic chamber (not shown) for displacing the rotor 7 in an advancing direction.

Numeral 27 indicates a oil control valve (hereinafter, referred to as OCV) for supplying hydraulic oil to the actuator 3 and controlling the quantity of the oil supplied. Numeral 28 indicates a substantially cylindrical valve housing having a port corresponding to an open end of pipelines 32–35 described later. Numeral 29 indicates a spool that slides in the valve housing 28 in an axial direction of the valve housing 28. Numeral 30 indicates a spring that urges the spool in one direction. Numeral 31 indicates a linear solenoid for actuating the spool 29 against the urging force of the spring 30. Numeral 32 indicates a supply pipeline for guiding the hydraulic oil supplied via an oil pump described later to the valve housing 28. Numeral 33 indicates a drain pipeline for returning the hydraulic oil inside the valve housing 28 to an oil pan described later. Numeral 34 indicates a first pipeline for guiding the hydraulic oil to the first oil passage 25. Numeral 35 indicates a second pipeline for guiding the hydraulic oil to the second oil passage 26. Numeral 36 indicates an oil pan. Numeral 37 indicates an oil pump. Numeral 38 indicates an oil filter for eliminating impurities from the hydraulic oil. The oil pan 36, the oil pump 37 and the oil filter 38 constitute a lubricating system for lubricating various parts o the engine (not shown). The oil pan 36, the oil pump 37, the oil filter 38 and the OCV 27 constitute a system for supplying the hydraulic oil to the actuator 3.

Numeral 39 indicates an engine block provided with a recess for accommodating the valve housing 28. The interior of the recess of the engine block 39 houses the pipelines 32–35 so as to allow open ends of the pipelines 32–35 to face respective ports of the valve housing 28.

Numeral 40 indicates an electronic control unit (ECU). The ECU controls fuel injection quantity, ignition timing and valve opening/closing timing by actuating an injector, ignitor and the OCV 27 based on signals from an intake air quantity sensor (not shown), a throttle sensor (not shown), a water temperature sensor (not shown), a crank angle sensor (not shown) and a cam angle sensor (not shown). The ECU also controls the OCV 27 closing timing subsequent to turning off of the ignition switch.

A description will now be given of the operation of the actuator 3 and the OCV 27.

When the engine is at a stop, the rotor 7 is at a position with a maximum lagging displacement. That is, the rotor 7 is rotated by a maximum advance angle with respect to the housing 5. The oil pump 37 is not in operation so that the hydraulic oil is not supplied to the first oil passage 25, the second oil passage 26 and the plunger oil passage 21. The pressure of the oil retained inside the actuator 3 is relatively low. Therefore, the plunger 19 is thrust against the holder 18 by the urging force of the spring 20. The engagement shaft portion 19a of the plunger 19 is engaged with the engagement hole 18a of the holder 18 so that the housing 5 and the rotor 7 remains locked to each other.

When the engine is started in this locked state, the oil pump 37 is put into operation so that the pressure of the hydraulic oil supplied to the OCV 27 is increased. The hydraulic oil is supplied by the OCV 27 to the lag oil hydraulic chamber (not shown) in the actuator 3 via the first pipeline 34 and the first oil passage 25. Due to the pressure built up in the lag oil hydraulic chamber, a slide plate (not shown) is displaced toward the advance oil hydraulic chamber (not shown) so that the lag oil hydraulic chamber and the plunger oil passage 21 communicate with each other. The hydraulic oil is supplied from the plunger 21 to the engagement hole 18a of the holder 18 and the plunger 19 is then thrust against the urging force of the spring 20. As a result of this, the engagement shaft portion 19a of the plunger 19 is pulled out of the engagement hole 18a of the holder 18 so that the plunger 19 and the rotor 7 become disengaged.

Subsequently, the hydraulic oil is supplied by the OCV 27 to the advance oil hydraulic chamber (not shown) via the second pipeline 35 and the second oil passage 26 so as to advance the rotor 7. The oil pressure is transmitted to the plunger oil passage 21 SO as to displace the plunger 19 toward the housing 5 against the urging force of the spring 20, thus disengaging the plunger 19 and the holder 18. The OCV 27 is operated (opened or closed) in this disengaged state so as to control the quantity of oil supplied to the lag oil hydraulic chamber and the advance oil hydraulic chamber, thus controlling the rotation of the rotor 7 with respect to the housing 5. The pressure of the oil supplied via the OCV 27 is subject to feedback control and computation by the ECU 40, in accordance with signals from a position sensor (not shown) for detecting a relative angle of rotation of the rotor 7 with respect to the housing 5 and a crank angle sensor (not shown) for determining the oil pressure applied by the oil pump 37.

In the related-art oil hydraulic actuator described above, when the valve housing 28 of the OCV 27 is introduced into the engine block 39 for installation, the open ends of the pipelines 32–35, provided in the engine block 39 so as to face the respective ports formed in the valve housing 28, may be displaced with respect to the respective ports, in a circumferential or axial direction of the valve housing 28. This results in communication between the pipelines 32–35 and the respective ports being obstructed so that the quantity of flow of the hydraulic oil is reduced.

SUMMARY OF THE INVENTION

Accordingly, an object of the present invention is to provide an OCV in which the drawback of the related art is eliminated.

Another and more specific object of the invention is to obtain an OCV provided with a valve housing capable of preventing reduction in the quantity of flow of the hydraulic oil even when the ports are displaced in position with respect to the pipelines.

The aforementioned objects can be achieved by an oil control valve for controlling supply of hydraulic oil to an oil hydraulic actuator via a plurality of pipelines, comprising: a cylindrical housing; a plurality of ports formed in a periphery of said housing so as to correspond to the plurality of pipelines; and grooves provided in the periphery of said housing so as to provide communication between an associated port and an associated pipeline. With this, even when displacement occurs between the pipeline and the port of the valve housing, the grooves ensure communication between the pipeline and the port. Thereby, reduction in the quantity of hydraulic oil is prevented.

The groove may be formed to extend from a bottom of the port to cover an entirety of the periphery of said housing. With this, even when displacement, in a circumferential direction of the valve housing, occurs between the pipeline and the port of the valve housing, the groove ensures communication between the pipeline and the port so that reduction in the quantity of hydraulic oil is prevented.

The groove, formed around the entirety of the valve housing, may have a width smaller than that of the port. With this, even when displacement between the pipeline and the port of the valve housing occurs, communication between the pipeline and the port is ensured so that reduction in the quantity of hydraulic oil is prevented.

The groove, formed around the entirety of the valve housing, may have a width identical to that of the port. With this, even when displacement, in a circumferential direction of the valve housing, occurs between the pipeline and the port of the valve housing, any portion of the groove, provided around the entirety of the valve housing, is available to replace the port for supply of the hydraulic oil. Accordingly, reduction in the quantity of hydraulic oil is successfully prevented.

The groove, formed around the entirety of the valve housing, may have a width larger than that of the port. With this, any portion of the groove, provided around the entirety of the valve housing, is available to replace the port for supply of the hydraulic oil. Accordingly, reduction in the quantity of hydraulic oil is successfully prevented.

The groove may extend from an edge of the port in an axial direction of said housing. With this, even when displacement, in an axial direction of the valve housing, occurs between the pipeline and the port of the valve housing, communication between the pipeline and the port is ensured so that reduction in the quantity of the hydraulic oil is prevented.

The groove, extending from an edge of the port in an axial direction of said housing, may include a taper inclined from the periphery of said housing toward a surface of the port. With this, even when displacement, in an axial direction of the valve housing, occurs between the pipeline and the port of the valve housing, the taper ensures communication between the pipeline and the port so that reduction in the quantity of the hydraulic oil is prevented.

BRIEF DESCRIPTION OF THE DRAWINGS

Other objects and further features of the present invention will be apparent from the following detailed description when read in conjunction with the accompanying drawings, in which:

FIGS. 3A–3E show a portion of the oil control valve shown in FIG. 2, FIG. 3A being a top view, FIG. 3B being a front view, FIG. 3C being a bottom view, FIG. 3D being a saggital sectional view taken at a line A—A, line C—C or line E—E of FIG. 3B, and FIG. 3E being a saggital sectional view taken at a line B—B or line D—D of FIG. 3B;

FIGS. 6A–6E show a portion of the oil control valve shown in FIG. 5, FIG. 6A being a top view, FIG. 6B being a front view, FIG. 6C being a bottom view, FIG. 6D being a saggital sectional view taken at a line A—A, line C—C or line E—E of FIG. 6B, and FIG. 6E being a saggital sectional view taken at a line B—B or line D—D of FIG. 6B;

DETAILED DESCRIPTION OF THE PREFERRED EMBODIMENTS

A detailed description will now be given of the best mode for carrying out the present invention, with reference to the attached drawings.

FIRST EMBODIMENT

Figure 1:
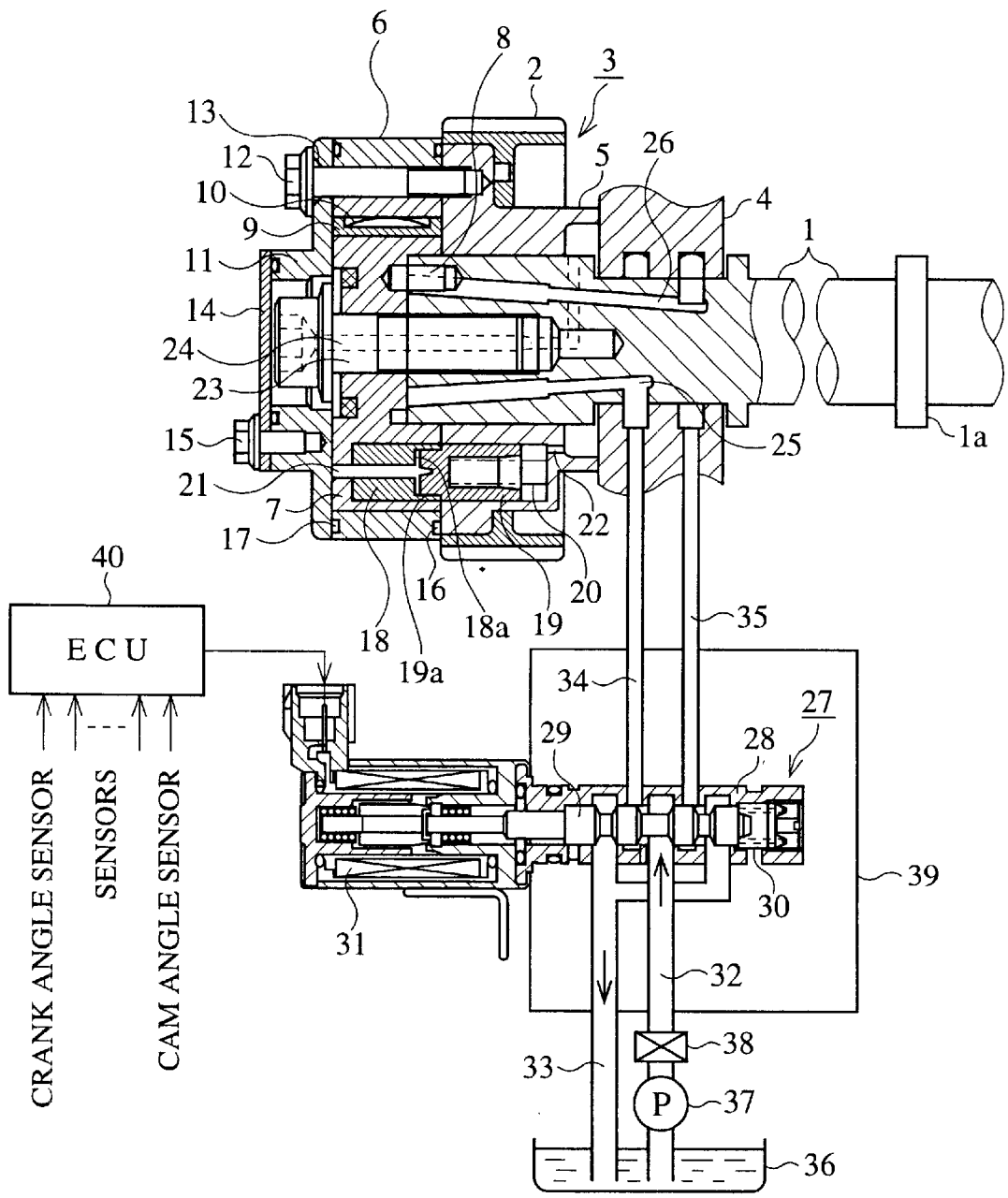
FIG. 1 is a sectional view showing an oil control valve in the related-art oil hydraulic actuator.
Figure 2:
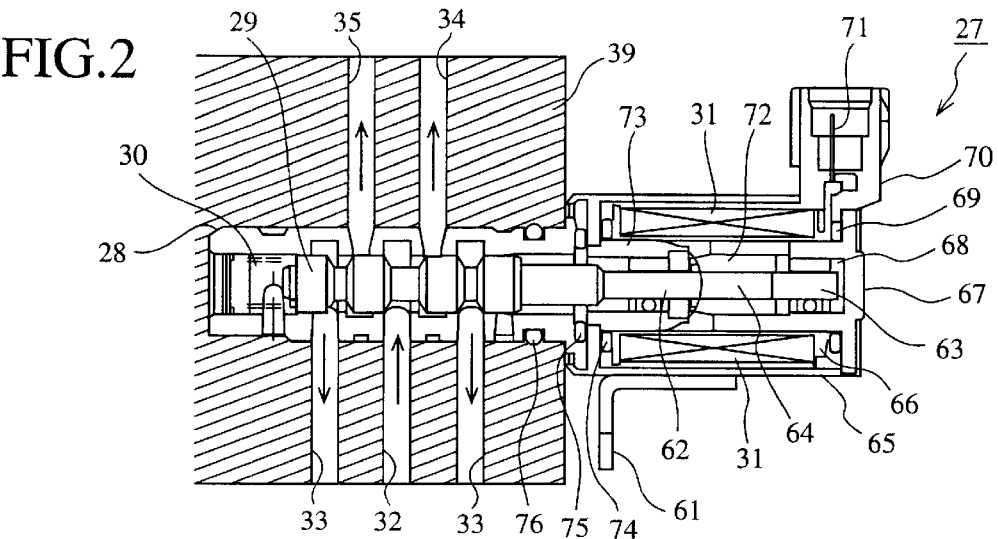
FIG. 2 is a sectional view showing an oil control valve according to a first embodiment of the present invention.
Figure 4:
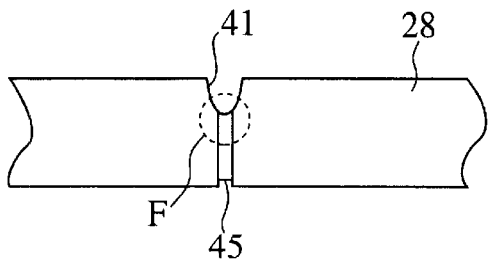
FIG. 4 is an enlarged front view showing displacement of a port in the oil control valve shown in FIG. 2 with respect to a pipeline of an engine block.

FIG. 2 is a sectional view showing an oil control valve according to a first embodiment of the present invention. FIGS. 3A–3E show a portion of the oil control valve shown in FIG. 2, FIG. 3A being a top view, FIG. 3B being a front view, FIG. 3C being a bottom view, FIG. 3D being a saggital sectional view taken at a line A—A, line C—C or line E—E of FIG. 3B, and FIG. 3E being a saggital sectional view taken at a line B—B or line D—D of FIG. 3B. FIG. 4 is an enlarged front view showing displacement of a port in the oil control valve shown in FIG. 2 with respect to a pipeline of an engine block. Those elements that constitute the oil control valve according to the first embodiment that are substantially identical to those constituting elements of the oil control valve according to the related art shown in FIG. 1 are designated by the same reference numerals and the description thereof is omitted.

Referring to figures, numeral 41 indicates a port formed in the valve housing 28 so as to correspond to the first pipeline 34; 42 indicates a port formed in the valve housing 28 so as to correspond to the second pipeline 35; 43 indicates a port formed in the valve housing 28 so as to correspond to the supply pipeline 32; 44 indicates a port formed in the valve housing 28 so as to correspond to the drain pipeline 33; 45 and 46 indicate annular grooves (hereinafter, referred to as peripheral grooves) that communicate with the ports 41 and 42, respectively, and extending in the periphery of the valve housing 28 in a circumferential direction thereof. The width of the peripheral grooves 45 and 46 is smaller than that of the ports 41 and 42. That is, the width of the peripheral grooves 45 and 46 is smaller than the length of the ports 41 and 42 in an axial direction of the valve housing 28.

Referring to the figures, numeral 61 indicates a bracket; 62 and 63 indicate sleeves; 64 indicates a rod; 65 indicates a case; 66 indicates a bobbin; 67 indicates a core; 68 indicates a spacer; 69 indicates an O ring; 70 indicates a cover; 71 indicates a terminal; 72 indicates a plunger; 73 indicates a boss; and 74–76 indicate O rings.

According to the first embodiment, even when an open end F of the first pipeline 34 is displaced as shown in FIG. 4 with respect to the port 41 in a circumferential direction of the valve housing 28, communication between the open end F and the port 41 is maintained since the open end F communicates with the peripheral groove 45 communicating with the port 41. Thus, reduction in the quantity of hydraulic oil in the first pipeline 34 and the second pipeline 35 is prevented.

In the description of the first embodiment given above, it is assumed that the peripheral grooves 45 and 46 are provided in the ports 41 and 42, respectively. However, the port 43 may also be provided with a peripheral groove. In this case, reduction in the quantity of hydraulic oil supplied from the oil pump 37 is prevented.

SECOND EMBODIMENT

Figure 5:
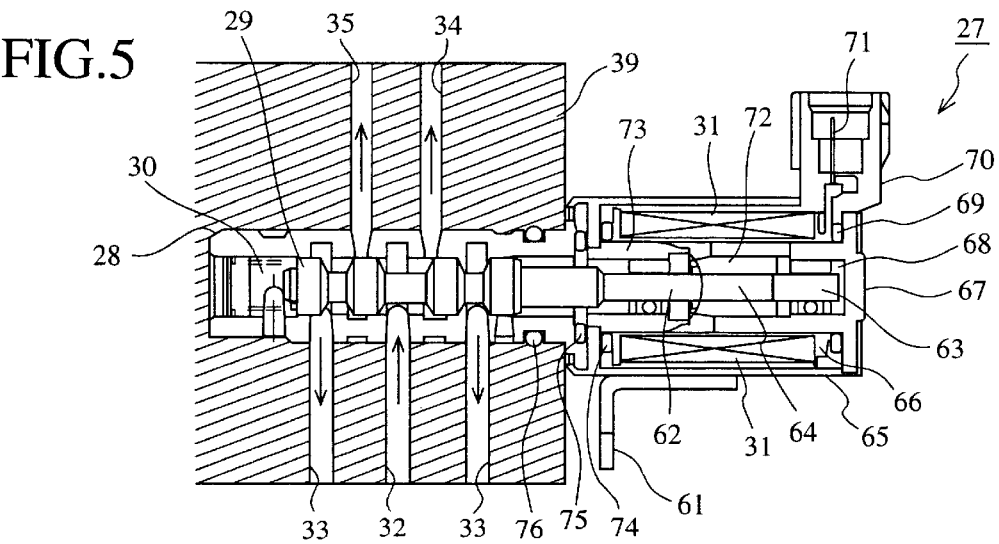
FIG. 5 is a sectional view showing the oil control valve according to a second embodiment.
Figure 7:
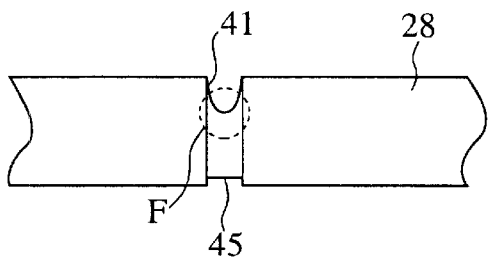
FIG. 7 is an enlarged front view showing displacement of a port in the oil control valve shown in FIG. 5 with respect to a pipeline of an engine block.

FIG. 5 is a sectional view showing the oil control valve according to a second embodiment. FIGS. 6A–6E show a portion of the oil control valve shown in FIG. 5, FIG. 6A being a top view, FIG. 6B being a front view, FIG. 6C being a bottom view, FIG. 6D being a saggital sectional view taken at a line A—A, line C—C or line E—E of FIG. 6B, and FIG. 6E being a saggital sectional view taken at a line B—B or line D—D of FIG. 6B. FIG. 7 is an enlarged front view showing displacement of a port in the oil control valve shown in FIG. 5 with respect to a pipeline of an engine block. Those elements that constitute the oil control valve according to the second embodiment that are substantially identical to those constituting elements of the oil control valve according to the related art or the first embodiment are designated by the same reference numerals and the description thereof is omitted.

The feature of the second embodiment is that the width of the peripheral grooves 45 and 46 is the same as the width of the ports 41 and 42, respectively. As shown in FIG. 7, as a result of this arrangement, even when the open end F of the first pipeline 34 is displaced with respect to the port 41 in a circumferential direction of the valve housing 28, communication between the open end F and the port 41 is maintained since the open end F communicates with the peripheral groove 45 communicating with the port 41. The second embodiment is advantageous in that, in case of displacement, in a circumferential direction of the valve housing 28, between the first pipeline 34 and the port 41 of the housing 28 or between the second pipeline 35 and the port 42 of the housing 28, any portion of the groove, provided around the entirety of the valve housing 28, is available to replace the port 41 or port 42 for supply of the hydraulic oil. Accordingly, reduction in the quantity of hydraulic oil is successfully prevented.

In the description of the second embodiment given above, it is assumed that the peripheral grooves 45 and 46 are provided in the ports 41 and 42, respectively. However, the port 43 may also be provided with a peripheral groove. In this case, reduction in the quantity of hydraulic oil supplied from the oil pump 37 is prevented.

Variation

Figure 8:
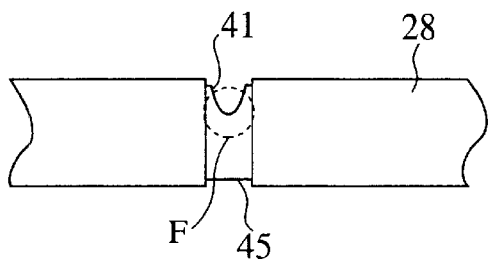
FIG. 8 is an enlarged front view showing displacement of a port in the oil control valve according to a variation of the second embodiment with respect to a pipeline of an engine block.

FIG. 8 is an enlarged front view showing displacement of a port in the oil control valve according to a variation of the second embodiment with respect to a pipeline of an engine block.

The feature of the variation of the second embodiment is that the width of the peripheral grooves 45 and 46 is larger than that of the ports 41 and 42. As shown in FIG. 8, as a result of this arrangement, even when the open end F of the first pipeline 34 is displaced with respect to the port 41 in a circumferential direction of the valve housing 28, communication between the open end F and the port 41 is maintained since the open end F communicates with the peripheral groove 45 communicating with the port 41. This variation is advantageous in that, in case of displacement, in a circumferential direction of the valve housing 28, between the first pipeline 34 and the port 41 of the housing 28 or between the second pipeline 35 and the port 42 of the housing 28, any portion of the groove, provided around the entirety of the valve housing 28, is available to replace the port 41 or port 42 for supply of the hydraulic oil. Accordingly, reduction in the quantity of hydraulic oil is successfully prevented.

THIRD EMBODIMENT

Figure 9:
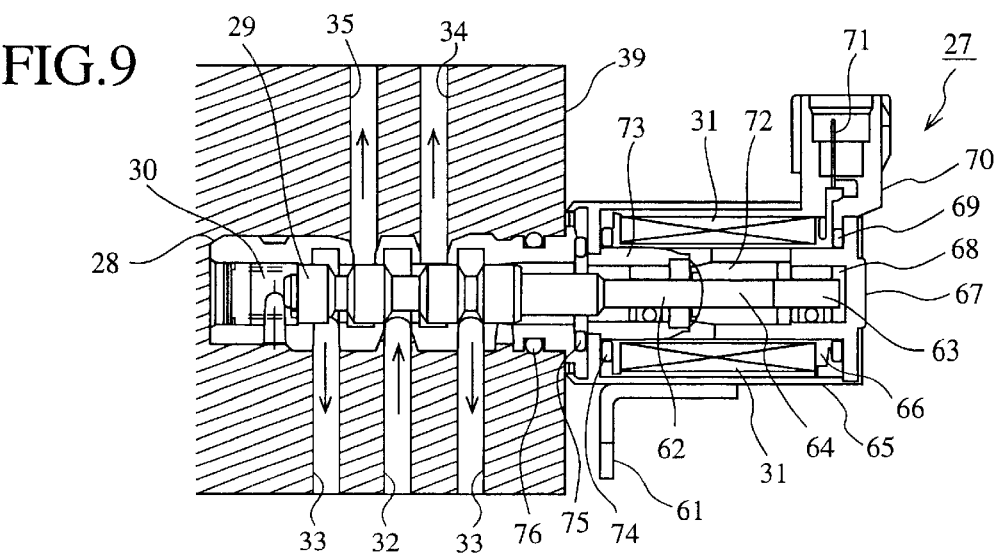
FIG. 9 is a sectional view showing the oil control valve according to a third embodiment.
Figure 11:
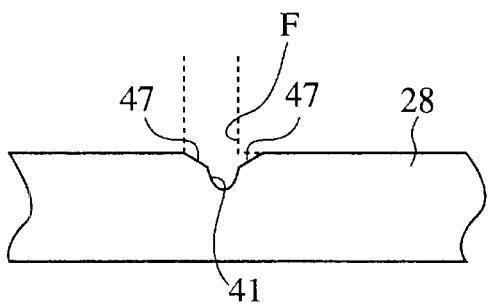
FIG. 11 is an enlarged front view showing displacement of a port in the oil control valve shown in FIG. 9 with respect to a pipeline of an engine block.
Figure 10A:
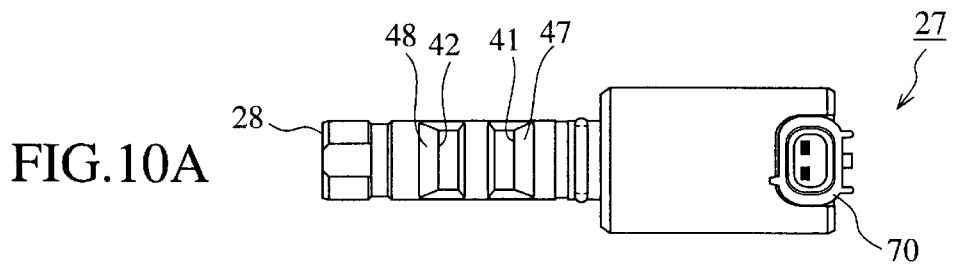
FIGS. 10A–10E show a portion of the oil control valve shown in FIG. 9, FIG. 10A being a top view, FIG. 10B being a front view, FIG. 10C being a bottom view, FIG. 10D being a saggital sectional view taken at a line A—A or line E—E of FIG. 10B, and FIG. 10E being a saggital sectional view taken at a line B—B, line C—C or line D—D of FIG. 10B.
Figure 10B:
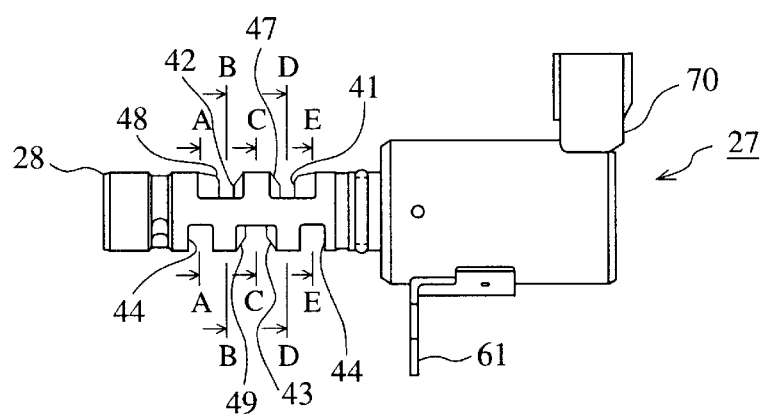
Figure 10C:
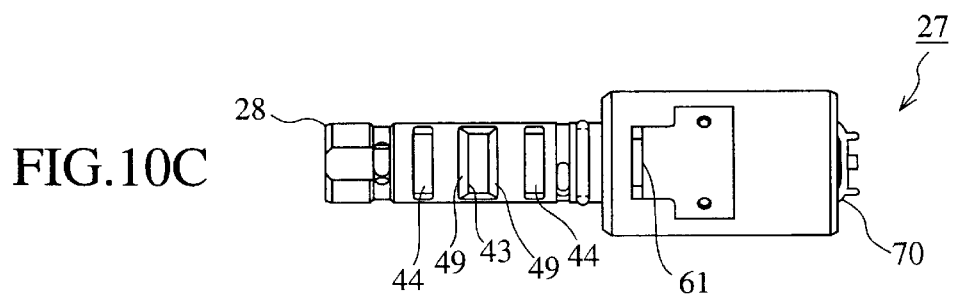
Figure 10D:
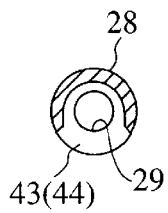
Figure 10E:
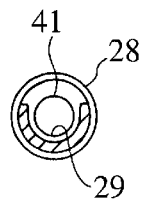

FIG. 9 is a sectional view showing the oil control valve according to a third embodiment. FIGS. 10A–10E show a portion of the oil control valve shown in FIG. 9, FIG. 10A being a top view, FIG. 10B being a front view, FIG. 10C being a bottom view, FIG. 10D being a saggital sectional view taken at a line A—A or line E—E of FIG. 10B, and FIG. 10E being a saggital sectional view taken at a line B—B, line C—C or line D—D of FIG. 10B. FIG. 11 is an enlarged front view showing displacement of a port in the oil control valve shown in FIG. 9 with respect to a pipeline of an engine block. Those elements that constitute the oil control valve according to the third embodiment that are substantially identical to those constituting elements of the oil control valve according to the related art or the first embodiment are designated by the same reference numerals and the description thereof is omitted.

The feature of the third embodiment is that, instead of providing the peripheral grooves in the valve housing 28 as in the first or second embodiment, tapers 47, 48 and 49 are provided adjacent to the ports 41, 42 and 43, respectively, in an axial direction of the valve housing 28. The tapers 47, 48 and 49 function to extend the width of the ports 41, 42 and 43, respectively. Therefore, as shown in FIG. 11, the in case of displacement, in an axial direction of the valve housing 28, between the port 41 and the open end F of the first pipeline 34, obstruction of communication between the pipeline and the port is prevented so that reduction in the quantity of the hydraulic oil is prevented.

In the foregoing description of the third embodiment, a taper is employed as a groove (hereinafter, referred to as a breadth groove) for extending the width of the port. Alternatively, a groove of any configuration may be employed as long as it extends from an edge of the port in an axial direction of the valve housing 28.

In the foregoing description of the first through third embodiments, the peripheral grooves or the breadth grooves are discussed as means for mediating communication between the port and the pipeline. Alternatively, the peripheral grooves and breadth grooves may be used in combination so as to achieve the effect of further preventing reduction in the quantity of hydraulic oil.

The OCV according to any of the first through third embodiments may be built into the actuator 3 of the related art shown in FIG. 1. In this case, even when displacement occurs between the port of the valve housing 28 and the pipeline of the engine block when building the OCV into the actuator 3, reduction in the quantity of the hydraulic oil is prevented due to the operation of the OCV according to any of the first through third embodiments. Therefore, normal operation of the oil hydraulic actuator is ensured.

The oil control valve according to the present invention is advantageously applied in that, even when displacement occurs between the port of the valve housing and the pipeline in the engine block, grooves ensure communication between the port and the pipeline. Accordingly, reduction in the quantity of hydraulic oil is prevented. The oil control valve of this construction finds a useful application in the oil hydraulic actuator.

The present invention is not limited to the above-described embodiments, and variations and modifications may be made without departing from the scope of the present invention.

What is claimed is:

1. An oil control valve for controlling supply of hydraulic oil to an oil hydraulic actuator via a plurality of pipelines, comprising:

a cylindrical housing;

a plurality of ports formed in a periphery of said housing so as to correspond to the plurality of pipelines;

grooves provided in the periphery of said housing and extending from a bottom of at least one of said ports to cover an entire circumference of said housing so as to provide communication between an associated port and an associated pipeline; and wherein the groove has a width smaller than that of the port.

2. An oil control valve for controlling supply of hydraulic oil to an oil hydraulic actuator via a plurality of pipelines, comprising:

a cylindrical housing;

a plurality of ports formed in a periphery of said housing so as to correspond to the plurality of pipelines;

grooves provided in the periphery of said housing and extending from a bottom of at least one of said ports to cover an entire circumference of said housing so as to provide communication between an associated port and an associated pipeline; and wherein the groove has a width larger than that of the port.

3. An oil control valve for controlling supply of hydraulic oil to an oil hydraulic actuator via a plurality of pipelines, comprising:

a cylindrical housing;

a plurality of ports formed in a periphery of said housing so as to correspond to the plurality of pipelines;

grooves provided in the periphery of said housing and extending from a bottom of at least one of said ports to cover an entire circumference of said housing so as to provide communication between an associated port and an associated pipeline; and wherein the groove extends from an edge of the port in an axial direction of said housing.

4. The oil control valve according to claim 3, wherein the groove includes a taper inclined from the periphery of said housing toward a surface of the port.

* * * * *